US007496723B1

(12) United States Patent
Hanavan, III

(10) Patent No.: US 7,496,723 B1
(45) Date of Patent: Feb. 24, 2009

(54) SERVER-FREE ARCHIVAL OF BACKUP DATA

(75) Inventor: Ernest Patrick Hanavan, III, Winter Springs, FL (US)

(73) Assignee: Symantec Operating Corporation, Mountain View, CA (US)

( * ) Notice: Subject to any disclaimer, the term of this patent is extended or adjusted under 35 U.S.C. 154(b) by 54 days.

(21) Appl. No.: 10/736,272

(22) Filed: Dec. 15, 2003

(51) Int. Cl.
*G06F 12/00* (2006.01)
(52) U.S. Cl. ...................................... 711/162
(58) Field of Classification Search ............... 711/161, 711/162
See application file for complete search history.

(56) References Cited

U.S. PATENT DOCUMENTS

| | | | |
|---|---|---|---|
| 6,035,412 A * | 3/2000 | Tamer et al. ............... | 714/6 |
| 6,772,309 B1 * | 8/2004 | Ohr et al. .................. | 711/163 |
| 6,938,136 B2 * | 8/2005 | Garimella et al. .......... | 711/162 |
| 6,950,871 B1 * | 9/2005 | Honma et al. .............. | 709/226 |
| 7,376,804 B2 * | 5/2008 | Ido et al .................... | 711/162 |
| 2002/0199073 A1 * | 12/2002 | Tamura et al. ............. | 711/162 |
| 2004/0153739 A1 * | 8/2004 | Trimmer et al. ............ | 714/7 |
| 2004/0153753 A1 * | 8/2004 | Yamaguchi et al. ........ | 714/13 |
| 2005/0021869 A1 * | 1/2005 | Aultman et al. ............ | 709/249 |

OTHER PUBLICATIONS

Microsoft Computer Dictionary, 1999, Microsoft Press, Fourth Edition, p. 293.*

John Merryman, "LAN-free backup vs. server-free backup in a SAN," SearchStorage.com, http//:searchstorage.techtarget.com/tip/o,289483,sid5_gci809457,00html, Mar. 11, 2002, (5 pages).
"Enterprise Storage Report Technical Review," Enterprise Storage Group, vol. 4, 2000, (5 pages).
Scott Bekker, "Tivolo Delivers SANergy," http//:redmondmag.com/news/print.asp?EditorialsID=975, Apr. 5, 2000 (2 pages).
"Galaxy™ Backup and Recovery," http//:web.archive.org/web/20031119035828/http//:www.commvault.com/products.asp?pid=1, Nov. 19, 2003, (4 pages).
"LAN/Server Free Backup Solutions," www.crossroads.com/Products/StorageProduction, Nov. 23, 2003, (2 pages).
Kaczmarski et al., "Beyond Backup Toward Storage Management," IBM Systems and Journal, vol. 42, Nov. 2, 2003 (pp. 322-337).

(Continued)

*Primary Examiner*—Brian R Peugh
(74) *Attorney, Agent, or Firm*—Robert C. Kowert; Meyertons, Hood, Kivlin, Kowert & Goetzel, P.C.

(57) ABSTRACT

Embodiments of a system and method for making an archival copy of business data by performing a third party copy of backup data across a SAN are described. A SAN may include a SAN fabric, multiple host/servers and multiple storage devices including archival storage devices. The SAN fabric may include the switches, hubs, bridges, routers, etc. necessary to allow any host/server to access any storage device. The host/servers may allow applications access to primary data stored in the SAN. At least one of the host/servers may run a backup server that is responsible for making backup and archival copies of the primary data stored on the storage devices by the applications. The backup server may initiate a server-free copy of the backup data through the SAN fabric to the archival storage devices.

19 Claims, 5 Drawing Sheets

OTHER PUBLICATIONS

"IBM Almaden Research Center—Serverless Backup," http://almaden.ibm.com/projects/serverless_backup.shtml, Aug. 20, 2003, (2 Pages).

"Server-Free for Crossroads Storage Routers—Data Sheet," Crossroads Systems, Inc., 2002. (2 Pages).

Rick Cook, "Server-Free Backup is not a Pancea," SAN/NAS Technical Tips, http://searchstorage.techtarget.com/tip/1,289483,sid_gci345387,00.html, Oct. 10, 2000.

"IBM Tivoli Storage Manager: LAN/WAN Backup; ServerFree Backup; LANFree Backup; and Split-Mirror Backup—What Does it all Mean?" www.redbooks.ibm.com/abstracts/TIP0118.html, Dec. 27, 2002, (4 Pages).

Jurgen Heyer, "Secure Protection Against Data Loss," PC Professional, Nr. 10, Sep. 2003, (5 Pages).

"Backup Software," PC PRO, Oct. 2003, (pp. 175-186).

"Dynamic Tape Device Sharing with ARCserve 2000 in the Storage Area Network," Fujitsu Computers Siemens, May 31, 2001, (63 Pages).

Brooks et al., "Disaster Recovery Strategies with Tivoli Storage Management," Redbooks, www.ibm.com/redbooks, Nov. 2002, (431 pages).

* cited by examiner

SERVER-FREE ARCHIVAL OF BACKUP DATA

BACKGROUND OF THE INVENTION

1. Field of the Invention

This invention is related to the field of storage management and, more particularly, to combining server free and disk-based backup of data in storage networks.

2. Description of the Related Art

The need for data storage capacity in enterprise systems is growing exponentially with no end in sight. One common storage architecture is direct attached storage (DAS). In most DAS configurations, a user's data resides on storage media directly connected to a host/server predominantly using small computer system interconnect (SCSI) technology, and normally there is but a single (i.e. non-fault tolerant) path for retrieving that data. Organizations are beginning to recognize that the restrictions imposed by DAS SCSI architecture are too costly to continue as a viable solution. Such restrictions include the following:

SCSI disk arrays must be located no more than 25 meters from the host server;

The parallel SCSI bus is susceptible to data errors resulting from slight timing discrepancies or improper port termination; and SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

Another primary concern of large enterprises is having their data available continuously. In order to insure a high degree of user data availability, data storage should be highly reliable. High reliability data storage is normally implemented by maintaining a backup copy of the data on a physically independent storage device. Under the DAS architecture maintaining a backup copy of user data requires copying the data from storage attached to one host/server to storage attached to another host/server over the LAN used by client/users. As the amount of user data maintained by an enterprise increases, the amount of LAN bandwidth required to perform timely data backup increases proportionately. At some point the copying of backup data may significantly interfere with the client/user's ability to use the network. The storage area network (SAN) architecture may significantly reduce the impact of data backup on the primary network.

The SAN model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

Since host primary data is stored on storage devices connected to the SAN, at least some of the SAN storage devices may use disk type technology to provide the access times required by the hosts. Traditionally, the cost of disk type storage has been relatively high and backup of primary data has been to the more mature and cost-effective tape type devices. Using this technology, primary data to be backed up may be read from disk storage by a host/server running a backup application. The host may then write the data to a tape drive storage device. For relatively small amounts of primary data, this method may be sufficient and may not overtax the capabilities of the host or the tape drive.

However, as the amount of data to be backed up increases the difference in speed between tape and disk type storage becomes increasingly significant. Disk type storage devices can be faster than tape by an order of magnitude or more in backup mode and many orders of magnitude faster during restore operations due to its random access capability. Also, as disk drive technology matures, the cost may become competitive with that of tape type storage devices for the backup of primary data making this option financially more attractive.

One way to perform disk-based backup of primary data is analogous to the method described above for tape-base backup. A host/server may read primary data from disk storage and write a backup copy of the primary data to physically separate disk drive devices. Another method for disk-based backup may be referred to as server-free. In a server-free backup environment data is copied directly from a SAN attached storage manager/client disk storing primary data, to a SAN attached backup drive via a SAN data mover using third party copy (3PC) including the SCSI extended copy command. The host/server sends commands to the data mover to tell it which blocks to copy from which SAN attached disk to which other SAN attached device. This method considerably reduces the overhead for primary data backup on the host/server.

Disk-based backup of primary data alone may not be sufficient to meet all the backup requirements of an enterprise. Specifically, data archival and off-site storage for disaster recovery may still require backup using a highly stable, mature technology such as magnetic tape. Also, some large enterprises are reluctant to adopt server-free technology as their method of primary data backup since it does not have an extensively proven track record.

SUMMARY

Embodiments of a system and method for making an archival copy of data by performing a third party copy of backup data across a SAN are described. A SAN may include a SAN fabric, multiple host/servers and multiple storage devices including archival storage devices. The SAN fabric may include the switches, hubs, bridges, routers, etc. necessary to allow any host/server to access any storage device. The host/servers allow applications access to primary data stored in the SAN. At least one of the host/servers may run a backup server that is responsible for making backup and archival copies of the primary data stored on the storage devices by the applications. The backup server may initiate a server-free copy of the backup data through the SAN fabric to the archival storage devices.

A server-free copy may also be referred to as a "Third Party Copy" (3PC). This SAN backup technique may use the SCSI Extended Copy command to copy data from one set of storage devices to another. These can be disks, tapes, or other types of storage devices. This SCSI protocol command can be used on devices in the SAN fabric.

Internally, the third party copy device that receives and performs the Extended Copy command may be known as a "data mover". The data mover may be an intelligent device somewhere in the SAN infrastructure that understands the extended copy command. This can be another server, but more likely will be a fabric device, such as, a SAN switch or storage router, or a smart-storage device, such as an intelligent tape device or disk device. In order to perform a 3PC backup, the backup host/server may need to perform some preparatory tasks prior to invoking the data mover.

If the destination of the extended copy is a removable media device, e.g. a tape drive, then the host may issue other SCSI commands to get the removable device into the proper position (i.e. loading or positioning the tape). The data mover may require a frozen image of the data, which is to be backed up. The backup server may provide this frozen image by any available method including, but not limited to snapshotting, cloning, and mirror splitting. The data mover may only be able to access the data to be backed up by physical disk addresses. The backup server may "map" the logical representation of the data to its absolute physical address ranges and provide this along with all the file or volume information necessary for the server-free copy command. Then the host may issue the server-free copy command to the data mover.

The server-free copy command (e.g. extended copy command) basically tells the third party copy device (data mover) to copy data from one storage device directly to another storage device across the SAN. After issuing the extended copy command, no further instructions have to be issued by the host to copy the data—the devices themselves perform the entire data copy operation through the SAN fabric under the supervision of the data mover. Upon completion of the extended copy command, the backup server may instruct the device storing the backup data to "thaw" the backup copy of the data. This may cause changes to the primary data collected during the archival process to be made to the backup copy. The backup server may also update the backup database to reflect the new status. By combining a traditional back up of primary data to disk with a server-free back up of the disk-based backup data, an additional level of data protection may be obtained and the impact on application servers may be minimized with server-free data copy, while allowing primary data to be backed up in any manner, such as a server-based backup to disk.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
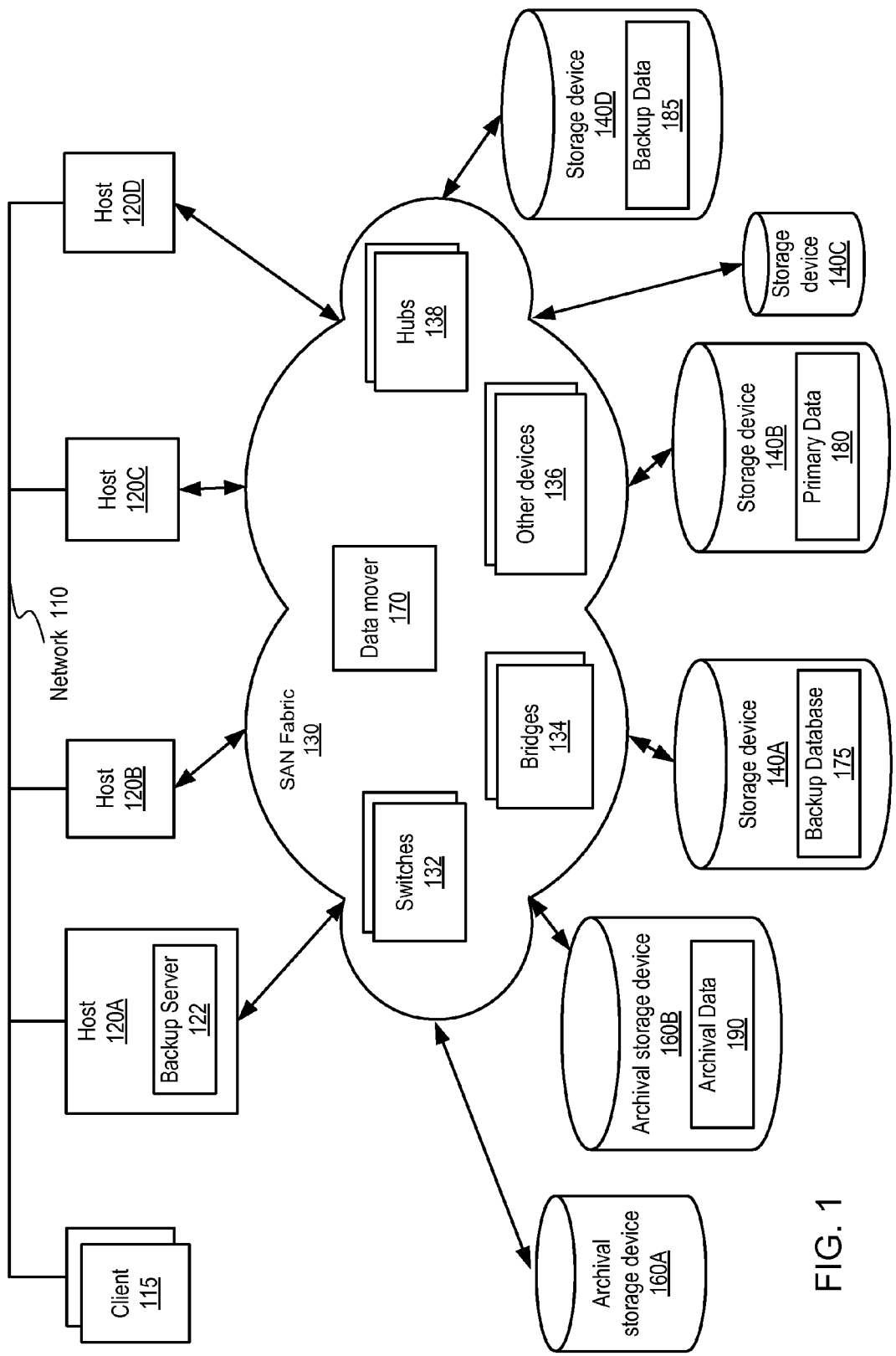
FIG. 1 illustrates an exemplary SAN system capable of implementing embodiments of third party copying of backup data to archival storage devices.

FIG. 1 illustrates an exemplary SAN system capable of implementing embodiments of server-free backup of backup data to archival storage devices, according to one embodiment. A SAN may be a high-speed network that enables fast, reliable access among host/servers 120 and storage resources 140. A SAN may be used to connect servers to storage devices, servers to each other, and storage devices to other storage devices through combinations of hubs 138, switches 132, bridges 134, and/or other devices 136 collectively referred to as a SAN Fabric 130.

A hub 138 may perform a repeater function, which is to amplify and/or regenerate a received signal and provide it at multiple outputs. A hub takes the data that comes into one port and sends it out all other ports that are included in the hub. It doesn't usually perform any filtering or redirection of data. Bridges 134 are useful for joining networks made of different media types or protocols together into larger networks, and keeping network segments free of data that doesn't belong in a particular segment. Bridges 134 may join networks or network segments, which use different protocols. In such cases, the bridge may perform lower layer translation on the packets that it transfers from one network to another.

A given SAN may include any number of the components described above depending on the number of host/servers and storage devices that it will interface. In some embodiments, the SAN may include only a subset of the types of SAN fabric components. SAN fabric 130 may also include a data mover 170. In some embodiments data mover 170 may be implemented as a stand-alone component separate from the other components of SAN fabric 130, but more frequently, the data mover may be implemented as a part of one of the other components of the SAN fabric. The data mover function may be located anywhere within the SAN fabric, within any of the components previously described. In addition the data mover 170 may be implemented as a component of the data storage devices 140 or archival storage devices 160. A more detailed description of the function of the data mover 170 is presented below.

One or more end-user platforms (clients 115) may access the SAN, typically via a LAN or WAN connection to one or more of the hosts 120 to access primary data 180. Primary data 180 may be any data that an application running on a platform attached to network 110 requires in order to perform its function. To guard against the inability to access primary data due to a failure of a device storing the primary data, for example, backup data may be created by copying primary data to storage devices that are physically separate from those storing the primary data on some periodic or non-periodic basis.

Storage devices 140 and 160 may include one or more of, but are not limited to, RAID (Redundant Array of Independent Disks) systems, disk arrays, JBODs (Just a Bunch Of Disks, used to refer to disks that are not configured according to RAID), tape devices, and optical storage devices. Normally, an enterprise's primary data may be stored on disk drive type storage devices to provide fast access time. In order to provide fault tolerance for devices storing primary data 180 and maintain the same level of data availability, it may be desired to store a backup copy 185 of the primary data on a type of storage device which may have a similar access time to that of the disk type device storing primary data 180.

Creation of backup copies of primary data 180 may be the responsibility of a backup server 122 running on, for example, host/server 120A. Backup server 122 may maintain a backup database 175 that indicates what primary data is backed up and where the backup copies are located. Each host/server 120 is typically connected to the fabric 130 via one or more Host Bus Adapters (HBAs). SAN fabric 130 may enable server-to-storage device connectivity through Fibre Channel switching technology. SAN fabric 130 hardware may include one or more fabric components, as described above, as well as the interconnecting cables (for Fibre Channel SANs, fibre optic cables).

Host/servers 120 may be any of various types of devices, including, but not limited to, personal computer systems, desktop computers, laptop or notebook computers, mainframe computer systems, workstations, network appliances, network computers, Internet appliances, or other suitable devices. Host system 120A may include at least one processor. The processor may be coupled to memory. Memory is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

SANs may be implemented using a wide variety of technologies. The SAN mix can include Enterprise Systems Connection (ESCON), Fiber Distributed Data Interface (FDDI), Asynchronous Transfer Mode (ATM), IBM's Serial Storage Architecture (SSA), and Fibre Channel. SAN architectures may also implement a number of underlying protocols, including TCP/IP and variants of SCSI (Small Computer System Interface). The most popular implementation of SAN for open systems is based on SCSI over Fibre channel. Fibre Channel Protocol (FCP) specifies how to run the SCSI command set over a dedicated Fibre Channel optical fabric. In direct server attached storage, a local SCSI controller on a peripheral bus fulfills a data request initiated by a SCSI driver in the host server. On a SAN, a Fibre Channel host bus adapter (HBA) may replace the SCSI controller in each server 120 to connect to the SAN fabric 130, which in turn may connect to disk arrays, tape drives, and other storage devices. A LUN (logical unit number) is the SCSI identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape devices and array controllers may incorporate multiple logical units to which I/O commands may be addressed. Each logical unit exported by an array controller may correspond to a virtual disk. SAN fabric 130 may be implemented, for example, in accordance with the Fibre Channel Switch Fabric-2 (FC-SW2) open standard specification to provide redundancy and ensure high data availability. SANs may be deployed in both homogeneous and heterogeneous environments. In a heterogeneous environment, a SAN may allow different kinds of servers, e.g. Windows NT, UNIX, Linux, Netware, and OS/390, to share different kinds of storage, e.g. disk, tape, and redundant arrays of inexpensive disks (RAID). With this shared capacity, organizations may be able to acquire, deploy, and use storage devices more cost-effectively.

As mentioned previously, backup data may be created from its primary data on a periodic or non-periodic basis to insure that the data is available in the event of failure of the storage device(s) storing the primary data or the accidental deletion of data by a user. In one embodiment, the creation of the backup data may be performed by a backup server copying primary data to a storage device(s) physically distinct from that storing the primary data. In other embodiments, the disk subsystem may set up one or more mirrors of the data. Every write request to the original data may be automatically duplicated to the other mirrors, or copies of that data, within that subsystem. When a copy of the data is required for a backup process, for example, the mirror may be temporarily suspended, or "split". The disk subsystem may be told to temporarily stop the mirrored writes going to one of the mirrors, and to save the writes in a separate location. A stable copy of the primary data may then be backed-up off the split mirror. When the backup is complete, mirroring may be resumed. The disk subsystem may first apply all the saved writes to the mirror from which the data was copied, and then resume normal mirror operations. The original file or volume may not be affected by splitting the mirror.

In addition to backing up primary data, an additional server free method of backup may be used to reduce the workload on the backup server, as discussed in detail below. In one embodiment, primary and backup data may be stored on disk type storage devices for speed of backup and restore operations, and additionally a server-free back up of the backup data may be performed from the backup disk storage.

Further backup, or archival, data may be created from backup data to insure data availability in the event of a more catastrophic event causing the failure of storage devices storing primary and backup data. In one embodiment, backup data may be copied by data mover 170 from a disk type storage device(s) to a tape type drive in order to produce the archival data without having to pass the data through one of the host servers. In other embodiments, the backup data may be copied by data mover 170 to any type storage device that permits the archival copy of the data to be located remotely from the backup data. In order to prevent overburdening the backup server with the additional copying of backup data, a server-free copy technique may be used to produce the archival data. The server-free method of data copying is discussed in detail below with FIGS. 3A & 3B.

Figure 2:
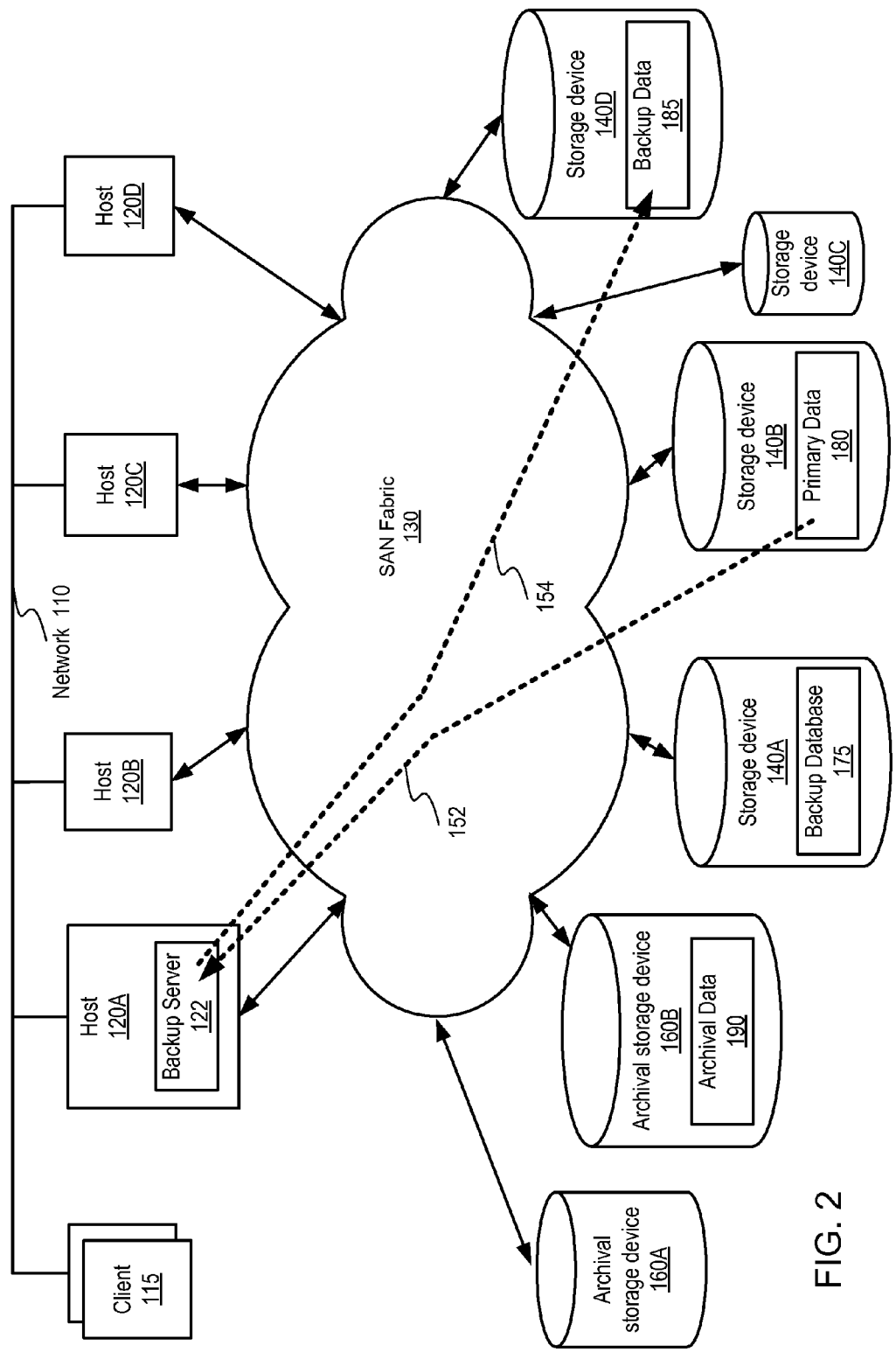
FIG. 2 illustrates the paths for command/data flow for a LAN-free backup, according to one embodiment.

FIG. 2 illustrates the paths for command/data flow for a backup of primary data, according to one embodiment. The backup server 122 may read the primary data 180 from storage device on the SAN 140B. The primary data may move through the SAN along path 152. The backup server 122 may read the data to its internal memory and then write a backup copy 185 through path 154 to storage device 140D that is physically separated from storage device 140B. In this way, the backup copy 185 of the data may be available via the SAN in the event of the loss of the storage device 140B storing the primary copy of the data 180. As shown in FIG. 2, performing a backup of primary data may involve data moving through the SAN, through a host backup server, and back through the SAN again to a backup disk. In other embodiments, primary data may be backed up using any other suitable backup technology, such as a server-free backup.

In SAN architecture systems, it may be desirable to limit the involvement of resources attached to the primary network in data backup to the greatest extent possible. In these cases, the workload of the backup server may be considerably reduced by using server-free backup. In a server-free backup, data may be copied via a data mover directly from the SAN attached storage device storing the data to be copied to another SAN attached storage device that is to store the copy data. The transfer of the data may actually be done by the data mover within the SAN fabric and therefore, the backup server may not have to read and write the data at all. The backup server may send commands to the data mover to tell it which blocks to copy from which SAN attached storage device to which other SAN attached storage device. The data may actually be copied rather than moved from one location to another. The data mover is a means for copying backup data through the SAN fabric to the one or more archival storage devices in response to the backup server initiating a server-free copy. Server-free copy provides a way to back up and restore large volumes of data between client-owned storage devices using a method that considerably reduces overhead on the backup server and the client.

Figure 3A:
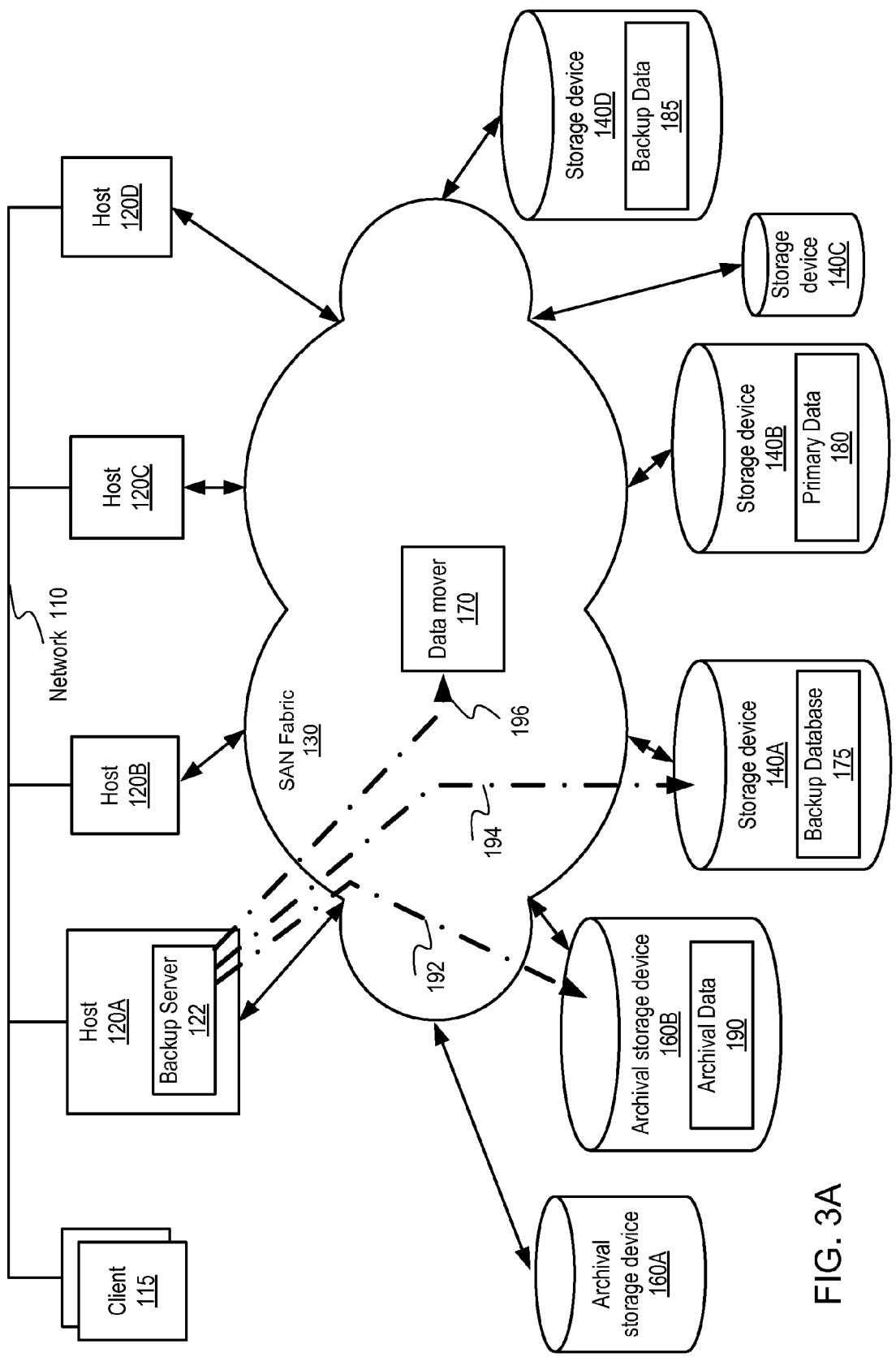
FIGS. 3A and 3B illustrate respectively the command and data flow for a server-free or third party copy, according to one embodiment.
Figure 3B:
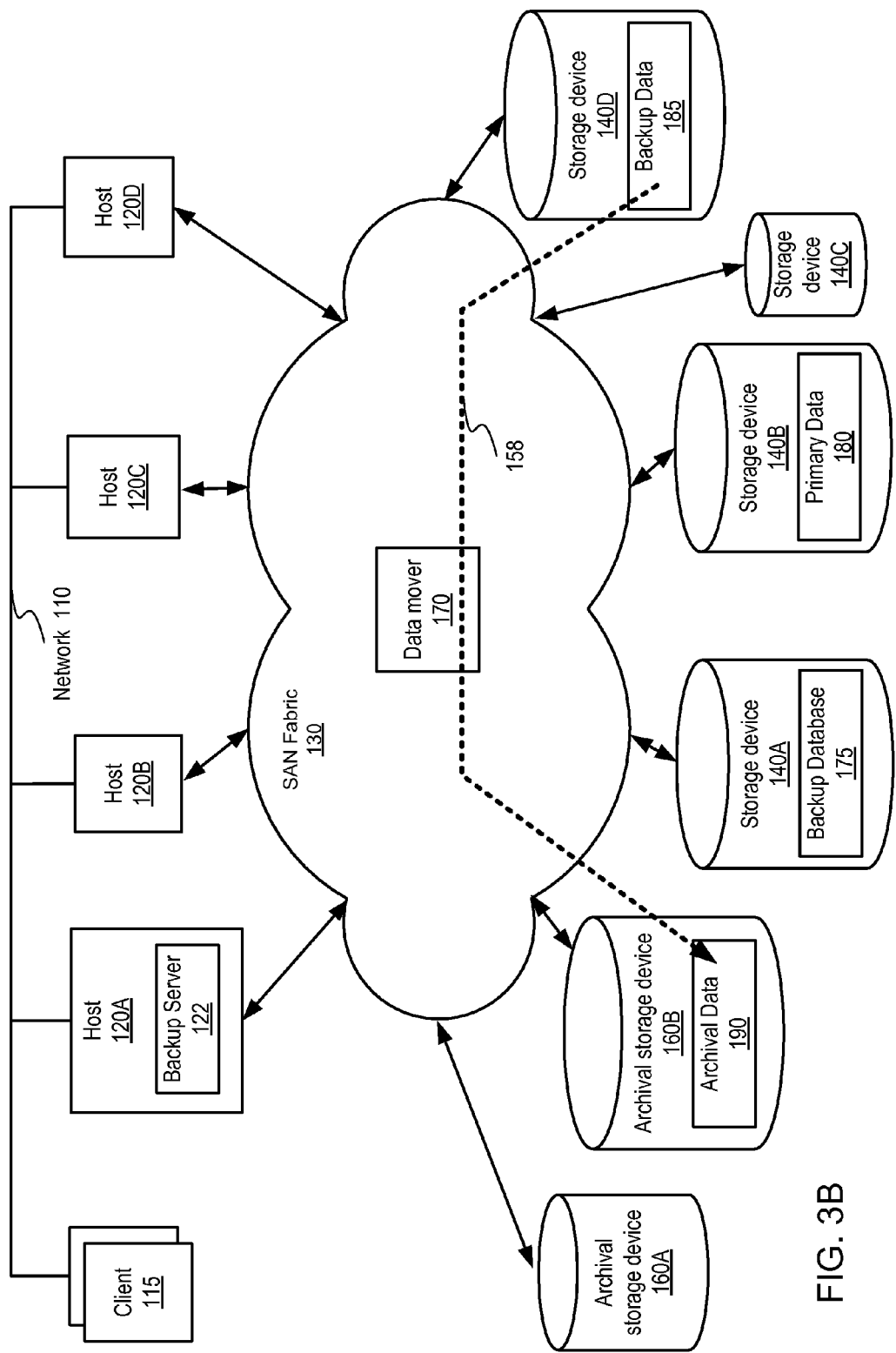

In addition to backing up primary data to disk-based storage, the backup data itself may be backed up to an archival storage. FIGS. 3A and 3B show the command and data flow paths for performing a server-free copy of backup data 185 from storage 140D to an archival device 160B across the SAN, according to one embodiment. Referring to FIG. 3A, when it is desired to produce an archival copy 190 of backup data 185, backup server 122 may issue commands 192 to archival storage device 160B to make preparations to receive the data. For example, if archival storage device 160B is a tape drive, commands 192 may cause the correct media to be mounted for storing archival data 190. Backup server 122 may provide source and destination information along with data extents to data mover 170 as indicated by 196.

FIG. 3B illustrates the flow of data across the SAN during the server-free copy of backup data from backup storage to archival, according to one embodiment. During the server-free copy operation, the movement of the data may be under the control of data mover 170 and require no participation from a host/server 120. Referring once again to FIG. 3A, when the creation of the archival copy has been completed, backup server 122 may send updates 194 to modify the contents of backup database 175 in storage device 140A to reflect the new status/location of the archival of backup data 185. Data that has been backed up using server-free data copy may be restored over a server-free path, or over the SAN through a host/server. By combining a traditional back up of primary data to disk with a server-free back up of the disk-based backup data, an additional level of data protection may be obtained and the impact on application servers may be minimized with server-free data copy, while allowing primary data to be backed up in any manner, such as a server-based backup to disk.

As mentioned previously, one way to perform server-less or server-free backup is the implementation of the SCSI-3 extended copy command. This is an extension to the original SCSI-3 specification. A "Third Party Copy" (3PC) SAN backup technique may use the SCSI Extended Copy command to copy data from one set of devices to another. These can be disks, tapes, or other types of storage devices. This SCSI protocol command can be used on devices connected via the SAN fabric.

A third party copy device that receives and performs the Extended Copy command may be referred to as the "data mover". The data mover is an intelligent device somewhere in the SAN infrastructure that understands the extended copy command. This may be another server, but more likely will be a fabric device, such as a SAN switch or router or a smart-storage device such as an intelligent tape device or disk device. In order to perform a 3PC backup, the backup host/server may need to perform some preparatory tasks prior to invoking the data mover, but does not need to read and write the data itself.

Figure 4:
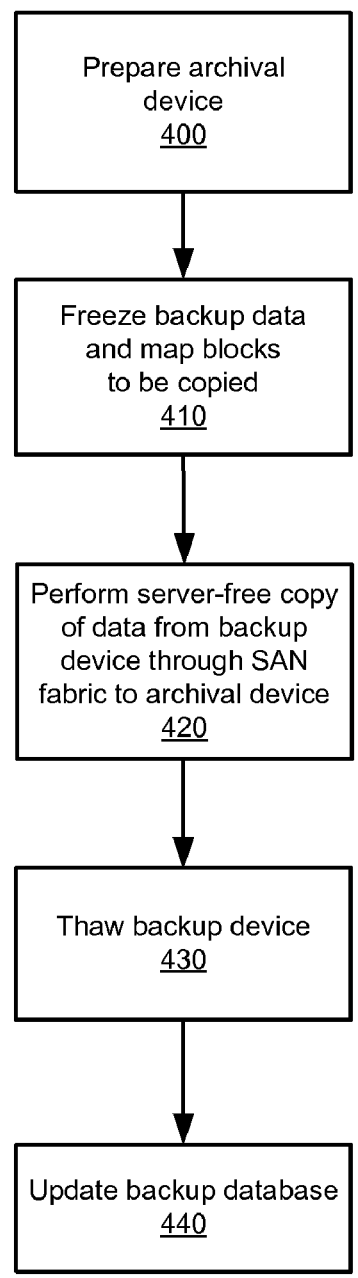
FIG. 4 is a flowchart of a method for performing a server-free copy through a SAN fabric, according to one embodiment.

FIG. 4 is a flowchart of a method for performing a server-free copy of backup data stored on disk across a SAN to an archival storage device, according to one embodiment. If the destination of the server-free copy is a removable media device, e.g. a tape drive, then the host may issue other SCSI commands to get the removable device into the proper position (e.g. loading or positioning the tape) as shown in block 400. The data mover may require a frozen version of the backup data, which is to be backed up. Thus, any further modifications to the backup data may temporarily be quiesced. The backup server may provide this frozen image by any suitable method including, but not limited to snapshotting, cloning, and mirror splitting. The data mover may only be able to access the data to be backed up by physical disk addresses. The backup server may "map" the logical representation of the data to its absolute physical address ranges, as indicated at block 410, and provide this along with all the file or volume information necessary for the extended copy command. Then the host may issue the server-free copy command to the data mover.

The server-free (e.g. extended) copy command basically tells the third party copy device (e.g. the data mover) to copy data from one storage device directly to another storage device across the SAN. After issuing the server-free copy command, no further instructions have to be issued by the host to move the data for the copy—the devices themselves perform the entire data copy operation through the SAN fabric under the supervision of the data mover, as shown at 420. Upon completion of the extended copy command, the backup server may "thaw" the backup device, as indicated in block 430. This may cause changes to the primary data collected during the archival process to be made to the backup copy. The backup server may also update the backup database to reflect information regarding the copy operation (e.g., to indicate the existence of the additional copy, location, and/or other information), as indicated in block 440.

Various embodiments of the disclosed invention may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising:
   one or more host servers, wherein one of the host servers comprises a backup server;
   a plurality of storage devices;
   a SAN fabric comprising one or more fabric devices configured to couple the one or more host servers to the plurality of storage devices;
   wherein one or more of the host servers are configured to store primary data on one or more of the storage devices;
   wherein, subsequent to the primary data being stored, one or more of the host servers are configured to initiate a backup operation of the primary data to store backup data of the stored primary data on one or more of the storage devices; and
   wherein one or more of the storage devices comprise one or more archival storage devices, and wherein the backup server is configured to initiate a server-free backup through the SAN fabric of said backup data to one or more of the archival storage devices, wherein to perform said server-free backup, said backup data is copied to the one or more of the archival storage devices through the SAN fabric without said backup data passing through the backup server.

2. The SAN as recited in claim 1, further comprising a data mover, wherein the data mover is configured to copy the backup data to the one or more archival storage devices in response to a server-free copy command.

3. The SAN as recited in claim 1, wherein the backup server is configured to copy primary data from one of the one or more storage devices to another of the one or more storage devices to create a backup copy of the primary data.

4. The SAN as recited in claim 1, wherein the backup server is configured to initiate a third party copy (3PC) function to create a backup copy of the primary data.

5. The SAN as recited in claim 1, wherein the backup server is configured to update a backup database in response to the completion of the server-free backup to the archival storage devices.

6. The SAN as recited in claim 1, wherein the backup data is stored on disk drive type storage devices.

7. A method, comprising:
   storing primary data to one or more storage devices in a storage area network (SAN);
   subsequent to said storing primary data, copying the stored primary data from the one or more storage devices to one or more other storage devices in the SAN to create a backup copy of the stored primary data;
   identifying backup data to be copied to an archive storage, wherein the backup data comprises the backup copy of the stored primary data;
   freezing the backup data to prevent the backup data from being altered;
   while the backup data is frozen, performing a server-free copy through the SAN of the backup data from the one or more other storage devices storing the backup data to the archive storage, wherein the server-free copy is initiated by a backup server, and wherein performing said server-free copy comprises copying the backup data to the archive storage through the SAN without the backup data passing through the backup server; and
   after completing the server-free copy, thawing the backup data so that the backup data may again be altered.

8. The method as recited in claim 7, wherein the backup server identifies the backup data to be copied to the archive storage, freezes the backup data to be copied, initiates the server-free copy of the data, and in response to the completion of the server-free copy, thaws the backup data.

9. The method as recited in claim 7, wherein a data mover copies the backup data to the archive storage in response to a server-free copy command.

10. The method as recited in claim 7, further comprising the backup server updating a backup database in response to the completion of the server-free copy to the archive storage.

11. The method as recited in claim 7, wherein the backup server performs said copying the stored primary data from the one or more storage devices to the one or more other storage devices to create the backup copy of the stored primary data.

12. The method as recited in claim 7, wherein the backup data is stored on disk drive type storage devices.

13. A computer-accessible storage medium, storing program instructions, wherein the program instructions are computer-executable to implement:
   subsequent to a host server storing primary data to one or more storage devices in a storage area network (SAN), a backup server initiating a backup operation to create a backup copy of the stored primary data, wherein the backup copy is stored on one or more other storage devices in the SAN;
   the backup server identifying backup data to be copied to an archive storage, wherein the backup data comprises the backup copy of the stored primary data;
   the backup server initiating the freezing of the backup data to prevent the backup data from being altered;
   while the backup data is frozen, the backup server initiating a server-free copy through the SAN of the backup data from the one or more other storage devices storing the backup data to the archive storage, wherein to perform said server-free copy, the backup data is copied to the archive storage through the SAN without the backup data passing through the backup server; and
   after completing the server-free copy, the backup server thawing the backup data so that the backup data may again be altered.

14. The computer-accessible storage medium as recited in claim 13, wherein the program instructions are further computer-executable to implement the backup server copying the primary data from the one or more storage devices to the one or more other storage devices to create the backup copy of the primary data.

15. The computer-accessible storage medium as recited in claim 13, wherein the program instructions are further computer-executable to implement sending a server-free copy command to a data mover to initiate copying the backup data to the archive storage.

16. The computer-accessible storage medium as recited in claim 13, wherein the program instructions are further computer-executable to implement the backup server updating a backup database in response to the completion of the server-free copy to the archive storage.

17. The computer-accessible storage medium as recited in claim 13, wherein the backup data is stored on disk drive type storage devices.

18. A storage area network (SAN), comprising:
   a plurality of storage devices configured to store primary, and backup data, and comprising one or more archival storage devices configured to store archival data;

one or more host servers configured to store the primary data on the plurality of storage devices, wherein at least one of the host servers comprises a backup server configured to copy the stored primary data to the plurality of storage devices as the backup data subsequent to the one or more host servers storing the primary data, and wherein the backup server is configured to initiate a third party copy (3PC) to produce the archival data from the backup data;

a SAN fabric comprising one or more fabric devices configured to couple the one or more host servers to the plurality of storage devices; and means for copying backup data through the SAN fabric to the one or more archival storage devices in response to the backup server initiating a third party copy, wherein to perform said copying, the backup data is copied to the one or more archival storage devices through the SAN fabric without the backup data passing through the backup server.

19. The SAN as recited in claim 18, wherein the backup data is stored on disk drive type storage devices.

* * * * *